3,850,859
Patented Nov. 26, 1974

3,850,859
DIFFICULTLY INFLAMMABLE POLYURETHANES AND PROCESS FOR MAKING THEM
Joachim Wortmann, Hermulheim, and Franz-Josef Dany and Joachim Kandler, Lechenich, Germany, assignors to Hoechst Aktiengesellschaft, Frankfurt am Main, Germany
No Drawing. Continuation-in-part of abandoned application Ser. No. 146,785, May 25, 1971. This application Mar. 15, 1973, Ser. No. 341,800
Claims priority, application Germany, July 23, 1970, P 20 36 592.8
Int. Cl. C08g 22/44, 51/58
U.S. Cl. 260—2.5 AJ                       5 Claims

ABSTRACT OF THE DISCLOSURE

The invention provides difficultly inflammable polyurethanes which are comprised of a condensation product of at least one polyol and an equivalent proportion of at least one organic isocyanate compound, the polyol being (a) a compound of the general formula (I)

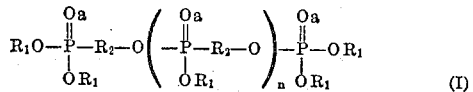  (I)

in which a stands for 1 or 0 and 1,
n stands for a number of between 0 and 4,
$R_1$ stands for at least one halogenated hydrocarbon radical and at least one hydroxyl-containing radical of the general formula (II)

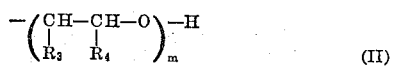  (II)

and $R_2$ stands for a radical of the general formula (III)

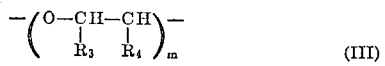  (III)

$R_3$ and $R_4$ in formulae (II) and (III) above standing for a hydrogen atom or a hydrocarbon radical having from 1 to 6 carbon atoms and being halogen-substituted, if desired, and m standing for a whole number of between 1 and 10, or (b) a mixture comprised of a compound of the general formula (I) and a conventional polyol.

---

This application is a continuation-in-part application of application Serial No. 146,785 filed May 25, 1971 by Wortmann et al., now abandoned.

The present invention relates to difficultly inflammable polyurethanes, more particularly to difficultly inflammable polyurethane foam plastics, and to a process for making them with the use *inter alia* of a phosphorus-and-chlorine-containing polyol as a flameproofing component.

Polyurethanes, particularly polyurethane foam plastics, find widespread uses in industry for a plurality of purposes, and they are still gaining increasing interest. On account of their excellent heat and sound-absorbing properties, polyurethane foam plastics are widely used for example, in the building industry, as heat insulator in refrigerators and cars, pipelines, tanks, tank cars, and for a plurality of further purposes. A particularly beneficial effect which polyurethanes offer is the case with which they can be produced on the spot. Polyurethane soft plastics are widely employed in commercial quantities for the manufacture of mattresses, upholstery for furniture and automobile seats, and for many other uses.

To be suitable for these uses, it is often necessary or at least desirable for the polyurethanes to have satisfactory flameproofing properties. Various attempts have already been made earlier to render polyurethanes difficultly inflammable, commonly by adding a phosphorus-containing flameproofing agent thereto. In those cases, however, in which these addends are merely incorporated with the plastics, they are likely to migrate or become extracted therefrom, under outdoor conditions, especially if polyurethane foam plastics are concerned. A substantial progress in flameproofing polyurethanes has been achieved through the use of phosphorus-containing polyols, which are chemically bound in polyurethanes. These polyols can be made, for example, by the additive combination of epoxides with an acid of phosphorus, or its acid esters. Phosphorus compounds having additional halogen therein are known to improve the non-inflammability of plastics as the use of phosphorus together with a halogen, which preferably is chlorine or bromine, has been found to produce a synergistic flameproofing effect.

It is commonly known that polyurethanes are produced by preparing a blend from high molecular weight compounds containing at least 2 active hydrogen atoms, and polyisocyanates in the presence of one or more catalysts and, if desired, expanding agents, surface-active substances and further auxiliaries. The compounds of high molecular weight include, for example, phosphorus and halogen-containing polyols, which may be used alone or in combination with further customary compounds, such as polyetherpolyols, polyesterpolyols polyester amides.

While phosphorus and halogen-containing polyols suitable for use as reaction components in the production of polyurethanes have been described earlier, for example in U.S. Pat. 3,256,240, the fact remains that these compounds have a relatively low concentration of phosphorus therein with the result that rather large quantities are required to be used so as to produce a satisfactory flameproofing effect. Polyols having phosphorus and chlorine therein are, however, more expensive than combustible polyols, such as those commonly used as starting material for making polyurethanes. This means in other words that the use of conventional flame-retardant polyols is a commercially unattractive procedure, in view of their low efficiency. In addition thereto, it is known that the cellular structure of polyurethane foam plastics is impaired by the incorporation of relatively large proportions of conventional phosphorus polyols.

It is an object of the present invention to provide a commercially attractive process for making reliably flameproof polyurethanes, more particularly polyurethane foam plastics, with the use *inter alia* of inexpensive polyol flameproofing agents having as high a concentration as possible of phosphorus and halogen therein, and this substantially in the absence of adverse effects upon the properties of the untreated polyurethane.

The difficultly inflammable polyurethanes of the present invention substantially comprise a condensation product of at least one polyol with an equivalent proportion of at least on organic isocyanate compound, the polyol being (a) a compound of the general formula (I)

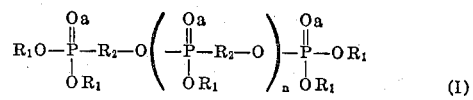  (I)

in which a stands for 1 or 0 and 1,
n stands for a number of between 0 and 4,
$R_1$ stands for at least one halogenated hydrocarbon radical and at least one hydroxyl-containing radical of the general formula (II)

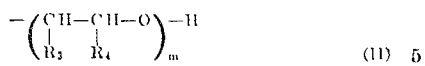 (II)

and $R_2$ stands for a radical of the general formula (III)

 (III)

$R_3$ and $R_4$ in formulae (II) and (III) above standing for a hydrogen atom or a hydrocarbon radical having from 1 to 6 carbon atoms and being halogen-substituted, if desired, and $m$ standing for a number of between 1 and 10, preferably 1 and 4, or (b) a mixture comprised of a compound of the general formula (I) and a conventional polyol.

In the above formula (I), $R_1$ may more particularly stand for an aliphatic or cycloaliphatic radical with one or more halogen substituetnts, for example a 2-chloroethyl radical or 2,3-dibromopropyl radical, or an aryl radical having at most 8 carbon atoms and one or more halogen substituents, whereas $R_3$ and $R_4$ represent a hydrogen atom, a methyl radical or chloromethyl radical.

The polyurethanes of the present invention may also comprise a condensation product of which the polyol component is a mixture of a product of general formula (I) above and compounds of the general formula (IV)

 (IV)

in which latter formula $a$ stands for 0 to 1 and $R_1$ stands for a halogenated hydrocarbon radical and/or a radical containing hydroxylic groups, the said mixture being used in further combination with conventional polyols, if desired.

The above mixture comprising the formula (I) compound and conventional polyol should preferably contain the formula (I) compound in a proportion of between about 1 and 90 weight percent, more preferably between about 5 and 10 weight percent.

Difficultly inflammable polyurethanes of which the isocyanate component is a di- and/or polyisocyanate, for example 2,4- and/or 2,6-toluylene-diisocyanate or diphenylmethane-4,4'-diisocyanate, have been found to be very suitable for practical uses. Polyols free from halogen and phosphorus, such as polyetherpolyols or polyesterpolyols may conveniently be used for making the condensation product having a conventional polyol therein.

The useful polyetherpolyols have, for example, a hydroxyl number of between 46 and 520 milligrams of KOH/gram, and the useful polyesterpolyols preferably have a hydroxyl number of 60 milligrams of KOH/gram.

It is a further object of the present invention to provide a process for making the difficulty inflammable polyurethanes by subjecting at least one polyol to condensation with an equivalent proportion of at least one organic isocyanate compound, if desired in the presence of one or more activators, expanding agents and/or cell regulators, which comprises using as the polyol (a) compound of the general formula (I)

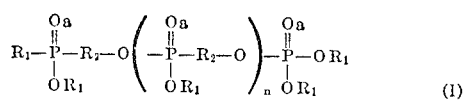 (I)

in which $a$ stands for 1 or 0 and 1,
$n$ stands for a number of between 0 and 4,
$R_1$ stands for at least one halogenated hydrocarbon radical and at least one hydroxyl-containing radical of the general formula (II)

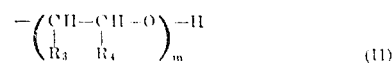 (II)

and $R_2$ stands for a radical of the general formula (III)

 (III)

$R_3$ and $R_4$ in formulae (II) and (III) above standing for a hydrogen atom or a hydrocarbon radical having from 1 to 6 carbon atoms and being halogen-substituted, if desired, and $m$ standing for a whole number of between 1 and 10, preferably 1 and 4, or (b) a mixture comprised of a compound of the general formula (I) and a conventional polyol.

In accordance with a preferred feature of the process of the present invention, $R_1$ stands for an aliphatic or cycloaliphatic radical with one or more halogen substituents, or an aryl radical having at most 8 carbon atoms and one or more halogen substituents, for example a 2-chloroethyl radical or 2,3-dibromopropyl radical, whereas $R_3$ and $R_4$ represent a hydrogen atom, a methyl radical or chloromethyl radical.

A still further preferred feature of the process of the present invention comprises using as the polyol a mixture of a product of general formula (I) above and compounds of the general formula (IV)

 (IV)

in which latter formula $a$ stands for 0 or 1 and $R_1$ stands for a halogenated hydrocarbon radical and/or a radical containing hydroxylic groups, which mixture may be used in further combination with conventional polyols.

The above mixture comprising the formula (I) compound and conventional polyol should preferably contain the formula (I) compound in a proportion of between about 1 and 90 weight percent, more preferably between about 5 and 50 weight percent.

A di- and/or polyisocyanate is preferably used as the isocyanate component in carrying out the condensation process of the present invention. 2,4- and/or 2,6-toluylene-diisocyanate or diphenylmethane - 4,4' - diisocyanate may be used, for example, as the isocyanate component. The useful conventional polyols include polyetherpolyols or polyesterpolyols, which are free from halogen and phosphorus. A polyetherpolyol with a hydroxyl number of between 46 are 520 milligrams of KOH/gram or a polyesterpolyol with a hydroxyl number of 60 milligrams of KOH/gram may, for example, be used as the polyol which is free from halogen and phosphorus.

The condensation reaction of the present invention should conveniently be initiated with the use of conventional activators, such as tertiary amines and/or organotin compounds. Polyurethane foam plastics are produced by adding customary expanding agents, such as chlorofluoroalkanes, and/or water as well as cell regulators, which are surface-active substances, such as polysiloxanes, to the reaction mixture.

The following statements are intended further to illustrate the present invention.

Compounds of the general formula (I) above can be made, for example, by the two process variants described hereinafter.

First process variant.—Halogenated aliphatic or cycloaliphatic alcohols or halogenated phenols are reacted in a first step, within a period of between about 0.5 and 5 hours, at a temperature of between 20 and 150° C., preferably between 50 and 100° C., with $P_2O_5$ in a molar ratio of less than 3:1, or with polyphosphoric acid or a mixture of polyphosphoric acid with $P_2O_5$, if desired in the presence of a phosphorous acid stabilizer and a disodium phosphate regulator, with the resultant formation of a mixture of partially esterified polyphosphoric acids, and the reaction mixture, which may be cooled, if desired, is treated in a second step with an epoxide of the following general formula (V):

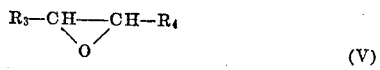

(V)

in which $R_3$ and $R_4$ stand for a hydrogen atom or a hydrocarbon radical having from 1 to 6 carbon atoms and being halogen-substituted, if desired, so as to esterify the free acid groups of the partially esterified polyphosphoric acids with the resultant formation of a polyol of formula (I) above.

Second process variant.—A compound of general formula (VI)

(VI)

in which $R_5$ stands for a halogenated hydrocarbon radical and $b$ stands for 0 or 1, is reacted, in a first step, within a period of between about 0.5 to 5 hours, at a temperature of between 20 and 180° C., with polyphosphoric acid or a mixture of polyphosphoric acid with $P_2O_5$, if desired in the presence of a phosphorous acid stabilizer and disodium phosphate regulator so as to partially esterify the polyphosphoric acid, and the resulting reaction mixture, which may be cooled, if desired, is treated in a second step with an epoxide of general formula (V), in which $R_3$ and $R_4$ have the meanings given above, so as to oxalkylate the free acid groups of the partially esterified polyphosphoric acids with the resultant formation of a polyol of formula (I) above.

For the production of polyurethane foam plastics, the polyols of the present invention, which may be used in combination with conventional polyols, may be employed in further combination with one or more activators, cell regulators, expanding agents and further aids and addends for, example colored pigments. The resulting mixture may be blended, immediately after its preparation or later, with the polyisocyanate or polyisocyanate mixture selected, and reacted therewith.

In the so-called preliminary polymerization process, a fraction of the isocyanate groups is reacted with the polyol, prior to the preparation of the polyurethane. If use is made of a combinaion of a fraction of the polyols of the present invention with conventional polyols, then it is possible to use the novel compounds also for making the preliminary polymer.

Conditional upon the degree of branching, which is a function of the hydroxyl number of the polyols, the polyurethane foam plastics so made are soft, hard or medium-hard foam plastics. Plastics containing approximately 5 weight percent or more of the present phosphorus and chlorine-containing polyols, based on the overall quantity of polyol, are already flameproof. In the burn-up test (ASTM D 1692–59 T), they are found to be "non-burning" or "self-extinguishing," and they reliably remain flameproof. A further beneficial effect which the novel polyols offer in the preparation of polyurethane foam plastics resides in the fact that they substantially do not thermally impair the foam plastics, impairment which normally manifests itself in a coloration of the interior of a block of foam plastics.

The substitution of up to 50 weight percent of polyols of the present invention for customary polyols has unexpectedly been found merely very slightly to modify the mechanical properties of polyurethane foam plastics, as compared with those of foam plastics produced exclusively with the use of conventional polyols.

The following Examples illustrate the process of the present invention and the properties and beneficial effects of the products obtained thereby. Needless to say the process and its products are not limited to the exemplary embodiments described therein.

In the following Examples 1–16, use was inter alia made of the following commercially avaliable products with the following composition:

(1) Desmophen 3800® (a product of Bayer Aktiengesellchaft, Leverkusen). This is a polyetherpolyol which has a hydroxyl number of 46 mg. KOH/g. It is prepared by reacting a blend of 75 weight percent of trimethylolpropane and 25 weight percent of propylene glycol with a blend of ethylene oxide and propylene oxide. The polyetherpolyol contains 78% of secondary and 22% of primary OH-groups and has a mean molecular weight of 3500, a viscosity of 575 centiposes at 25° C., and an acid number of less than 1 mg. KOH/g.

(2) Desmophen 2200® (a product of Bayer Atiengesellchaft, Leverkusen). This is a polyetherpolyol with a hydroxyl number of 60 mg. KOH/g. It is prepared by esterification of adipic acid with diethyleneglycol and addition of 1 weight percent of trimethylolpropane. The polyesterpolyol has a molecular weight of 2000 and a viscosity of 20,000 centipoises at 25° C.

(3) Caradol 520® (a product of Deutsche Shell-Chemie Gesellschaft MBH, Frankfurt). This is a propoxylated glycerol/sucrose-mixture with a molecular weight of about 300.

EXAMPLE 1

(a) Preparation of the phosphorus and halogen-containing polyol

A reactor fitted with stirrer, thermometer, gas inlet and reflux cooler was charged first with 2950 grams of tris-2-chloroethyl phosphate (10.3 mols) and 294 grams of phosphorus pentoxide (2.06 mols) as well as 349 grams (1.03 mol) of polyphosphoric acid containing 84 weight percent of $P_2O_5$ were then added thereto with the exclusion of air and moisture and while maintaining a temperature of 25° C. The mixture was heated to 60° C. and the $P_2O_5$ therein was dissolved. Following the addition of 32 grams of $H_3PO_3$ and 10 grams of $Na_2HPO_4$, the mixture was further heated to 90° C. and maintained at that temperature for 3 hours. Ethylene oxide was then introduced into the mixture at 60–80° C. until termination of the oxalkylation reaction. This was indicated by a strong reflux of material in the cooler charged with methanol and Dry Ice. Ethylene oxide in excess was expelled by means of nitrogen from the reaction mixture at 90° C. and 4608 grams of an almost colorless liquid, which had a density of $D_4^{20} = 1.44$ grams/cubic centimeter, were obtained. The product contained 29.5 weight percent of $P_2O_5$, 23.7 weight percent of chlorine and had a hydroxyl number of 114 milligrams of KOH/gram and an acid number of 2.5 milligrams of KOH/gram.

(b) Preparation of polyurethane foam plastics 17.6 grams of the phosphorus and chlorine-containing polyol so made were blended at room temperature with the following components:

55.7 grams of a polyetherpolyol, which had a hydroxyl number of 46 milligrams of KOH/gram, (Desmophen 3800®, Bayer Aktiengesellschaft, Leverkusen),
4.2 grams of water,
0.12 gram of an amine catalyst (Niax-Catalyst A1®, Union Carbide). The catalyst is a mixture of 70 weight percent of bis(2-dimethylaminoethyl)ester and 30 weight percent of dipropylene glycol,
0.21 gram of tin-II-octoate and
1.0 gram of polysiloxane (silicone oil L 520®, Union Carbide).

The blend so made was mixed, with rapid agitation, with 53.1 grams of a mixture of 2,4-toluylene diisocyanate and 2,6-toluylene diisocyanate in the ratio of 80:20. After it had been stirred for approximately 20 seconds, the mixture commenced foaming. It was immediately poured into a larger container. Following an approximately 85 second expansion period, the form commenced hardening. This was terminated after 10 minutes. It the foam is allowed to harden at room temperature, it should be post-hardened for approximately a further 3 hours. A maximum period of 10 minutes was needed to harden the foam at 80° C. The foam plastics so made had a unit weight of approximately 27 grams per liter and self-extinguishing properties (ASTM D 1692–59 T).

EXAMPLE 2

The following substances were mixed together in a manner analogous to that described in Example 1.

10.0 grams of the halogen and phosphorus-containing polyol of Example 1, which had a hydroxyl number of 114 milligrams of KOH/gram,
80.8 grams of a polyesterpolyol with a hydroxyl number of 60 milligrams of KOH/gram, (Desmophen 2200®, Bayer Aktiengesellschaft, Leverkusen),
4.7 grams of water,
1.8 grams of dimethylbenzylamine,
0.4 gram of tin-II-octoate,
1.0 gram of silicone oil (Union Carbide L 532®) and
1.0 gram of trichlorofluoromethane.

The mixture so made was blended with 51.0 grams of a mixture of 2.4- and 2.6-toluylene diisocanate in the ratio of 80:20. After 15 seconds, the foaming mixture began to expand over a period of 65 seconds and needed approximately 5 minutes at 80° C. to harden. The foam plastics so made had a unit weight of approximately 25 grams/liter and self-extinguishing properties.

EXAMPLE 3

(a) Preparation of the halogen and phosphorus-containing polyol 404 grams of tris-2-chloroethyl-phosphite (1.5 mols), 169 grams of polyphosphoric acid containing 84 weight percent of $P_2O_5$ (0.5 mol) and 2 grams of $Na_2HPO_4$ were heated to 60° C. and further heated for 1 hour to 90–95° C. The resulting mixture was allowed to cool down to 60° C. and ethylene oxide was introduced thereinto until strong reflux commenced to occur, and unreacted epoxide was expelled at 90° C. by means of nitrogen. 768 grams of a slightly colored liquid, which contained 25.2 weight percent of $P_2O_5$ and 11.3 weight percent of chlorine and had a hydroxyl number of 146 milligrams of KOH/gram, were obtained.

(b) Preparation of foam plastics 8 grams of the above phosphorus and chlorine-containing polyol were stirred together at 40° C. and for 2 hours with 53.1 grams of an isomer mixture of 2,4- and 2,6-toluylene diisocyanates, in the ratio of 80:20. The resulting reaction mixture, which had a viscosity substantially the same as that of the isocyanate mixture, was further stirred at room temperature with a mixture of the following components:

74.8 grams of a polyetherpolyol which had a hydroxyl number of 46 milligrams of KOH/gram, (Desmophen 3800®, Bayer Aktiengesellschaft, Leverkusen),
4.2 grams of water,
0.08 gram of an amine catalyst (Niax-Catalyst A1®, Union Carbide),
1.0 gram of silicone oil L 540® (Union Carbide), and
0.28 gram of tin-II-octoate.

After approximately 35 seconds, the mixture began to foam. This was terminated after approximately 75 seconds. The hardening period was 10 minutes at 80° C. The flameproof foam plastics had a unit weight of approximately 30 grams/liter.

EXAMPLE 4

The procedure was the same as that described in Example 3, save that the reaction product consisting of the phosphorus and chlorine-containing polyol and isocyanate mixture, was stored for 4 weeks at approximately 25° C. and successively foamed with the substance mixture of Example 3. The properties of the foam plastics so made could not be found significantly to differ from those of the product obtained in Example 3.

EXAMPLE 5 (Comparative example)

A non-flameproof foam plastic was made solely with the use of the polyetherpolyol of Example 1 for reaction with the isocyanate. More particularly, the following components were mixed together:

100 grams of a polyetherpolyol, which had a hydroxyl number of 46 milligrams of KOH/gram, (Desmophen 3800®, Bayer Aktiengesellschaft, Leverkusen),
4.2 grams of water,
0.12 gram of an amine catalyst (Niax-Catalyst A1®, Union Carbide),
1 gram of silicone oil L 520® (Union Carbide), and
0.21 gram of tin-II-octoate.

The mixture so made was combined, with rapid agitation, with 53.1 grams of an isomer mixture comprising 80% of 2,4- and 20% of 2,6-toluylene diisocyanate. After 25 seconds the mixture expanded over a period of 80 seconds. After a hardening period of 10 minutes at 80° C., the foam plastics had a unit weight of 25 grams/liter.

EXAMPLE 6

(a) Preparation of the phosphorus and halogen-containing polyol

A mixture of 1863 grams of tris-2-chlorethyl phosphate (6.5 mols), 737 grams of polyphosphoric acid (84 weight percent of $P_2O_5$; 2.17 mols), 26 grams of phosphorus acid and 8 grams of $Na_2HPO_4$ was heated for 1 hour to 150° C. and successively cooled down to 80° C. Ethylene oxide was introduced at that temperature into the reaction mixture until strong reflux commenced to occur. Unreacted ethylene oxide was expelled from the reaction mixture by means of nitrogen at 90° C. and 4426 grams of a slightly yellowish liquid, which had a density of $D_4^{20}=1.35$ grams/cubic centimeter, contained 24.8 weight percent of $P_2O_5$ and 15.5 weight percent of chlorine, and had a hydroxyl number of 212 milligrams of KOH/gram, were obtained.

(b) Preparation of the foam plastics 49.1 grams of the polyol containing phosphorus and chlorine so made were blended at room temperature with the following components:

80 grams of a polyetherpolyol, which had a hydroxyl number of 520 milligrams of KOH/gram, (Caradol 520®, Deutsche Shell-Chemie Gesellschaft MBH),
1 gram of water,
1 gram of silicon oil SF 1066® (Polysiloxane of General Electric),
3 grams of triethylamine, and
24 grams of trichlorofluoromethane.

150 grams of methylenediphenyl-4,4'-diisocyanate were rapidly stirred into the above mixture. After 30 seconds, the mixture began to expand over a period of 120 seconds. The flameproof polyurethane hard foam plastics hardened within 5 minutes at 20° C. It had a unit weight of 34 grams/liter.

EXAMPLE 7

(a) Preparation of the phosphorus and halogen-containing polyol

A rector fitted with stirrer, thermometer, gas inlet and reflux cooler was charged first with 241.5 grams of 2-chloroethanol (3 mols) and 213 grams of phosphorus pentoxide (1.5 mols) were successively added with the exclusion of air and moisture, which were expelled by means of nitrogen flowing countercurrently with respect thereto. The reaction mixture was maintained at a maximum temperature of 40° C. by cooling with ice. Following complete dissolution of the phosphorus pentoxide, 1 gram of phosphorus acid and 1.2 gram of $Na_2HPO_4$ were added. The mixture was stirred for 30 minutes at 45° C. The reflux cooler was charged with a blend of methanol and Dry Ice, and ethylene oxide was then introduced into the reaction mixture at 50° C. until strong reflux indicated that the reaction was complete. Unreacted ethylene oxide was expelled at 90° C. by means of nitrogen. 895 grams of a slightly yellowish liquid were obtained. Ethylene oxide was absorbed at the rate of 438.3 grams (approximately 10 mols). The product contained 23.9 weight percent of $P_2O_5$, 11.4 weight percent of chlorine and had a hydroxyl number of 212 milligrams of KOH/gram. Its acid number was smaller than 1 milligram of KOH/gram.

(b) Preparation of the foam plastics 12.3 grams of the phosphorus and chlorine-containing polyol so made were combined with 1 gram of water,
1 gram of silicone oil SF 1066® (General Electric),
3 grams of triethylamine,
24 grams of trichlorofluoromethane, and
95 grams of a polyetherpolyol, which had an OH-number of 520 milligrams of KOH/gram (Caradol 520®, Deutsche Shell-Chemie Gesellschaft MBH).

150 grams of methylenediphenyl-4,4'-diisocyanate were rapidly stirred into the mixture so made. After 40 seconds, the mixture began to expand over a period of 85 seconds. A flameproof polyurethane hard foam plastics with a unit weight of 35 grams/liter was obtained. It was hard after 2.5 minutes at 20° C.

EXAMPLE 8

(a) Preparation of the phosphorus and halogen-containing polyol

A mixture of 190 grams of tris-2-chloroethyl phosphate (0.67 mol), 113 grams of polyphosphoric acid (84 weight percent of $P_2O_5$; 0.33 mol), 3 grams of phosphorous acid and 0.9 gram of $Na_2HPO_4$ was heated for one hour to 150° C. Following this, the mixture was cooled down to 50° C. and 289 grams of propylene oxide were dropped thereinto over 3 hours. Unreacted propylene oxide in excess was expelled and 581 grams of slightly yellowish liquid, which contained 25.2 weight percent of $P_2O_5$ and 11.3 weight percent of chlorine and had a hydroxyl number of KOH/gram, were obtained.

(b) Preparation of the foam plastics 23.2 grams of the phosphorus and chlorine-containing polyol so made were blended with the following components:

90 grams of a polyetherpolyol, which had a hydroxyl number of 520 milligrams of KOH/gram, (Caradol 520®, Deutsche Shell-Chemie Gesellschaft MBH),
1 gram of silicone oil SF 1066® (General Electric),
3.5 grams of triethylamine, and
20 grams of trichlorofluoromethane.

150 grams of methylenediphenyl-4,4'-diisocyanate were rapidly stirred into the mixture so made. After 25 seconds, the mixture began to expand over a period of 75 seconds. After a 2.5 minute hardening period at 20° C., there was obtained a flameproof polyurethane hard foam plastics, which had a unit weight of 35 grams/liter.

EXAMPLE 9

(Comparative Example)

A mixture composed of the following components was prepared at room temperature:

27.9 grams of tris-2-chloroethyl phosphate,
100 grams of a polyetherpolyol, which had a hydroxyl number of 520 milligrams of KOH/gram, (Caradol 520®, Deutsche Shell-Chemie Gesellschaft MBH),
1 gram of water,
1 gram of silicon oil SF 1066® (General Electric),
3 grams of triethylamine, and
24 grams of trichlorofluoromethane.

150 grams of methylenediphenyl-4,4'-diisocyanate were added and the resulting mixture was rapidly stirred. After 45 seconds, the mixture began to expand over a period of 90 seconds, and a flameproof polyurethane hard foam plastics, which had a unit weight of 35 grams/liter, was obtained. The hardening period was 3.5 minutes.

EXAMPLE 10

(Comparative Example)

A foam plastics of conventional composition was prepared. To this end, the following components were blended together: 49.1 grams of a polyol compound of the following formula

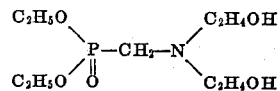

60.4 grams of polyetherpolyol, which had an OH-number of 520 milligrams of KOH/gram (Caradol 520®, Deutsche Shell-Chemie Gesellschaft MBH),
1 gram of water,
1 gram of silicone oil SF 1066® (General Electric),
3 grams of triethylamine, and
24 grams of trichlorofluoromethane.

The mixture so made was rapidly poured into 150 grams of methylenediphenyl-4,4'-diisocyanate. After 25 seconds, the mixture began to expand over a period of 100 seconds. After a 4 minute hardening period, a flameproof foam plastics, which had a unit weight of 35 grams/liter, was obtained.

EXAMPLE 11

(Comparative example)

A polyurethane hard foam plastics was prepared with the use of a polyol containing phosphorus and halogen, described in U.S. Pat. 3,256,240. The polyol was made by reacting phosphoric acid with epichlorhydrin. It had a hydroxyl number of 202 milligrams of KOH/gram and contained 8 weight percent of $P_2O_5$ and 18.7 weight percent of chlorine. The foam plastics was made by first blending the following components together:

49.1 grams of the phosphorus and chlorine-containing polyol, which had an OH-number of 201 milligrams of KOH/gram,
81.4 grams of a polyetherpolyol, which had an OH-number of 520 milligrams of KOH/gram, (Caradol 520®, Deutsche Shell-Chemie Gesellschaft MBH).
1 gram of water,
1 gram of silicone oil SF 1066® (General Electric),
3 grams of triethylamine, and
24 grams of trichlorofluoromethane.

150 grams of methylenediphenyl-4,4'-diisocyanate were then rapidly stirred into the mixture so made. After 35 seconds, the mixture began to expand over a period of 130 seconds. A flameproof polyurethane hard foam plastics, which had a unit weight of 34 grams/liter, was obtained. The hardening period was 6.5 minutes.

EXAMPLE 12

(Comparative example)

A foam plastics free from phosphorus and halogen was prepared. To this end, the following components were blended together:

100 grams of a polyetherpolyol, which had a hydroxyl number of 520 milligrams of KOH/gram, (Caradol 520®, Deutsche Shell-Chemie Gesellschaft MBH),
1 gram of water,
1 gram of silicone oil SF 1066® (General Electric),
3 grams of triethylamine, and
24 grams of trichlorofluoromethane.

150 grams of methylenediphenyl-4,4′-diisocyanate were rapidly stirred into the mixture so made. After 40 seconds, the mixture began to expand over a period of 85 seconds. A polyurethane hard foam plastics, which had a unit weight of 35 grams/liter, was obtained. The hardening period was 3 minutes.

EXAMPLE 13

(Comparative Example)

(a) Preparation of polyol containing phosphorus and halogen 0.445 mol of a phosphite-polyphosphonate of the formula

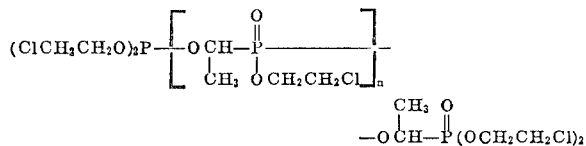

$$-O\overset{CH_3}{\underset{|}{C}}H-\overset{O}{\underset{\|}{P}}(OCH_2CH_2Cl)_2$$

in which $n$ averaged a value of about 4, was reacted in the manner described in Example 1 of U.S. Pat. 3,317,510 with 0.445 mol of pentaerythritol. About 500 grams of a colorless viscous reaction product, which contained 16.4% of P and 20.6% of Cl and which had a hydroxyl number of 142 mg. of KOH/g., were obtained.

(b) Preparation of polyurethane soft foam plastic

A blend was prepared from 17.6 grams of the polyol obtained as described under (a) above,
55.7 grams of a polyetherpolyol with a hydroxyl number of 46 mg. KOH/g. (Desmophen 3800®, a product of Bayer Aktiengesellschaft, Leverkusen),
4.2 grams of water,
0.15 gram of an amine catalyst (Niax catalyst 41®, a product of Union Carbide),
0.20 gram of tin (II) octoate,
1.0 gram of silicon oil L 520® (a product of Union Carbide).

The blend so made was mixed with 54.5 grams of a further blend prepared from 2,4- and 2,6-toluylene diisocyanates in a ratio of 80:20. The resulting blend needed 22 seconds to commence foaming. The expansion period was 90 seconds and the hardening period was about 10 minutes at 80° C. The foam plastic so made had a unit weight of 27 g./liter and was self-extingishing (ASTM D 1692–59 T).

EXAMPLE 14

(Comparative Example)

The phosphorus and halogen-containing polyol of Example 13 was used for making a flameproof polyurethane hard foam plastic. To this end, a blend was made from:

49.1 grams of the phosphorus and halogen-containing polyol which had a hydroxyl number of 142 mg. KOH/g.,
80 grams of a polyetherpolyol which had a hydroxyl number of 520 mg. KOH/g. (Caradol 520®, a product of Deutsche Shell-Chemie Gesellschaft MBH, Frankfurt),
1 gram of water,
1 gram of silicon oil SF 1066® (Polysiloxane, a product of General Electric),
3 grams of triethylamine,
24 grams of trichlorofluoromethane.

148 grams of methylenediphenyl-4,4′-diisocyanate were rapidly stirred into the blend so made. After 30 seconds, the resulting blend commenced foaming and began to expand over a period of 125 seconds. The resulting flameproof hard plastic, which had a unit weight of 34 g./liter, was found to harden within 5 minutes at 20° C.

EXAMPLE 15

(Comparative Example)

A blend with the following composition was prepared at room temperature.

49.1 grams of a dipropylene-glycol-hexol-tetraphosphite, which contained 9.6% P and which had a hydroxyl number of 256 mg. KOH/g.,
80 grams of a polyetherpolyol with a hydroxyl number of 520 mg. KOH/g. (Caradol 520®, a product of Deutsche Shell-Chemie Gesellschaft mbH, Frankfurt),
1 gram of water,
1 gram of silicon oil SF 1066® (Polysiloxane, a product of General Electric),
3 grams of triethylamine and
24 grams of trichlorofluoromethane.

148 grams of methylenediphenyl-4,4′-diisocyanate were rapidly stirred into the blend so made. After 28 seconds, the resulting blend commenced foaming and began to expand over a period of 112 seconds. The resulting flameproof hard foam plastic, which had a unit weight of 35 g./liter, was found to harden within 5 minutes at 20° C.

The polyurethane soft foam plastics made in Examples 1 to 5 and 13 and the polyurethane hard foam plastics made in Examples 6 to 12, 14 and 15 were tested as to their properties and the test results summarized in the following Tables 1 and 2. In the Tables, the various columns have the following meanings:

A and J, respectively: Unit weight of the foam plastics in grams/liter.

B and K, respectively: Quantity of phosphorus and halogen containing polyol used in combination with conventional polyol (weight percent).

$C_1$, $C_2$ and $L_1$, $L_2$, respectively: ASTM D 1692–59 T burn-up test. The tests were made immediately after preparation of the foam plastics. $C_1$ and $L_1$, respectively, are the burn-up rate expressed in millimeters per minute, and $C_2$ and $L_2$, respectively, are the burn-up length in millimeters until self-extinction.

D: Burn-up test as defined in DIN 53 438 (DIN=German Industrial Standard); the foam plastics are classified in various burning classes $K_1$, $K_2$, $K_3$.

E: Dimensional stability of the foam plastics after storage for 16 days at 70° C. and 100% relative atmospheric moisture. Following this, the foam plastics was dried for 24 hours at 70° C. and the change in volume (in percent) was established.

F: Permanent set (deformation under load) (DIN-test 53 572) in percent after 72 hours at 70° C. and 90% compression.

G: Tensile strength (DIN–test 53 571) expressed in kp./square centimeter.

$H_1$, $H_2$: Load absorbed by foam plastics in grams per square centimeter; the load necessary to compress a test specimen with the dimensions of 50 x 50 x 2.5 millimeters, down to 20% ($H_1$) and 60% ($H_2$), respectively, of its initial volume, was determined.

$M_1$, $M_2$: ASTM D 1692–59 T burn-up test. The foam plastics was stored for 4 weeks at 90° C. $M_1$ is the burn up rate in millimeters/minute, and $M_2$ the burn-up length in millimeters until self-extinction.

$N_1$, $N_2$: ASTM D 1692-59 T burn-up test. The foam plastics was exposed to outdoor conditions for 7 months, prior to testing it. $N_1$ is the burn-up rate in millimeters per minute, and $N_2$ the burn-up length in millimeters until self-extinction.

$O_1$, $O_2$: DIN 53 438 burn-up test. Test $O_1$ was made immediately after preparation of the foam plastics, and test $O_2$ after storage for 4 weeks at 90° C.

P: Dimensional stability of foam plastics in percent after storage for 4 weeks at 70° C. and 95% relative atmospheric moisture.

Q: DIN 53 421 compression test in kp./square centimeter.

R: DIN 53 421 compression test (10% compression) in kp./square centimeter.

S: DIN 53 422 shear test in kp./square centimeter.

The test results indicated in the following Tables 1 and 2 show that the polyurethane foam plastics of the present invention have a substantially better flameproofness than the comparative foam plastics. Despite the presence of phosphorus and halogen in the polyurethane molecule, the physical properties of the polyurethane remained unaffected, as compared with polyurethane free from phosphorus and halogen. The tensile strength or load absorption data, for example, were even found to have been improved. The polyurethane foam plastics of the present invention have also stand evry critical test with, and have a better flameproofness than, conventional phosphorus and halogen-containing polyurethanes, such as those described in working Example 10.

TABLE 1

| Example | A | B | $C_1$ | $C_2$ | D | E | F | G | $H_1$ | $H_2$ |
|---|---|---|---|---|---|---|---|---|---|---|
| 1 | 27 | 24 | | 1 | K1/10 mm. | +5.1% | 8.3 | 0.81 | 32 | 96 |
| 2 | 25 | 11 | | 5.5 | K1/10 mm. | −1.3% | 6.2 | 0.93 | 40 | 109 |
| 3 | 30 | 9.7 | | 9.0 | K1/10 mm. | +4.8% | 6.8 | 0.88 | 35 | 98 |
| 5 | 25 | 0 | 163 | | K3/10 mm. | +4.2% | 5.1 | 0.76 | 28 | 85 |
| 13 | 27 | 24 | | 14 | K2/10 mm. | +4.4% | 13.0 | 0.9 | | |

NOTE.—Examples 1-3: Examples describing invention; Examples 5 and 13: Comparative examples.

TABLE 2

| Example | J | K | $L_1$ | $L_2$ | $M_1$ | $M_2$ | $N_1$ | $N_2$ | $O_1$ | $O_2$ | P | Q | R | S | T |
|---|---|---|---|---|---|---|---|---|---|---|---|---|---|---|---|
| 6 | 34 | 38.0 | | (¹) | | (¹) | | (¹) | K1/10 mm. | K1/10 mm. | +6.1 | 3.76 | 3.68 | 2.85 | 2.57 |
| 7 | 35 | 11.5 | | 16.8 | | 16.9 | | 18.1 | K1/10 mm. | K1/10 mm. | +2.0 | 3.83 | 3.74 | 2.72 | 2.59 |
| 8 | 35 | 17.6 | | 3.1 | | 3.7 | | 8.5 | K1/10 mm. | K1/10 mm. | −3.2 | 3.72 | 3.80 | 2.77 | 2.46 |
| 9 | 35 | 21.8 | | 4.0 | 87 | | | 35.0 | K1/10 mm. | K3/10 mm. | +10.5 | 1.81 | 1.69 | 1.59 | 1.43 |
| 10 | 35 | 44.8 | | 20.5 | | 20.3 | | 21.1 | K1/10 mm. | K1/10 mm. | +6.2 | 3.81 | 3.69 | 2.80 | 2.58 |
| 11 | 34 | 37.6 | | 28.0 | | 32.0 | | 31.5 | K1/10 mm. | K1/10 mm. | +8.6 | 3.70 | 3.63 | 2.71 | 2.49 |
| 12 | 35 | 0 | 244 | | 240 | | 250 | | K3/10 mm. | K3/10 mm. | +1.5 | 3.87 | 3.71 | 2.81 | 2.62 |
| 14 | 34 | 38.0 | | 4.0 | | | | | K1/10 mm. | | +5.0 | 3.65 | 3.54 | 2.79 | 2.53 |
| 15 | | 38.0 | | 42.0 | | | | | K3/10 mm. | | +2.5 | 3.88 | 3.73 | 2.82 | 2.60 |

¹ Nonburning.

NOTE.—Examples 6-8: Examples describing invention; Examples 9-12, 14, and 15: Comparative examples.

What is claimed is:

1. A fire-resistant polyurethane foam prepared by incorporating into the reactant mixture used to prepare the polyurethane foam—the said reactant mixture consisting essentially of an organic di- or polyisocyanate, a polyetherpolyol compound having a hydroxyl number of between 46 milligrams and 520 milligrams of KOH/gram or a polyesterpolyol compound having a hydroxyl number of 60 milligrams of KOH/gram and having an activator, an expanding agent and a cell regulator therein—a fire resistance imparting product in an amount between about 5 and 50 weight percent, based on the amount of the poylyether or polyester polyol compound, the product consisting of a compound of the general formula (I)

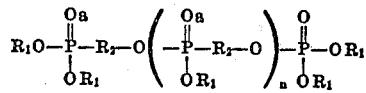  (I)

in which $a$ stands for 1 or 0 and 1

$n$ stands for a number of between 0 and 4, $R_1$ stands for at least one halogenated alkyl radical selected from the group consisting of a 2-chloroethyl radical and a 2,3-dibromopropyl radical, and at least one hydroxyl-containing radical of the general formula (II)

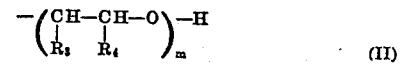  (II)

and $R_2$ stands for a radical of the general formula (III)

  (III)

$R_3$, $R_4$, in formulae (II) and (III) above standing for a hydrogen atom, a methyl radical or a chloromethyl radical and $m$ standing for a whole number of between 1 and 4.

2. The polyurethane as claimed in claim 1, wherein the isocyanate component is 2,4- or 2,6-toluylene-diisocyanate, diphenylmethane-4,4'-diisocyanate or a mixture of 2,4- and 2,6-toluylene-diisocyanates.

3. The polyurethane as claimed in claim 1, wherein the activator is a tertiary amine or organotin compound or a mixture thereof.

4. The polyurethane as claimed in claim 1, wherein the expanding agent is a chlorofluoralkane or water or a mixture thereof.

5. The polyurethane as claimed in claim 1, wherein the cell regulator is a polysiloxane.

References Cited
UNITED STATES PATENTS

| | | | |
|---|---|---|---|
| 3,423,486 | 1/1969 | Ratz et al. | 260—2.5 |
| 3,737,397 | 6/1973 | Baranauckas et al. | 260—2.5 |
| 3,317,510 | 5/1967 | Birum | 260—2.5 |
| 3,332,893 | 7/1967 | Birum et al. | 260—2.5 |
| 3,472,919 | 10/1969 | Nagy et al. | 260—2.5 |
| 3,220,961 | 11/1965 | Friedman | 260—2.5 |
| 3,256,240 | 6/1966 | Smith | 260—2.5 |

DONALD E. CZAJA, Primary Examiner

E. C. RZUCIDLO, Assistant Examiner

U.S. Cl. X.R.

106—15 FP, 260—2.5 AR, 45.7 P, DIG. 24.